US010234886B2

(12) United States Patent
Asghari et al.

(10) Patent No.: US 10,234,886 B2
(45) Date of Patent: Mar. 19, 2019

(54) MANAGEMENT OF GRID-SCALE ENERGY STORAGE SYSTEMS

(71) Applicant: NEC Laboratories America, Inc., Princeton, NJ (US)

(72) Inventors: Babak Asghari, San Jose, CA (US); Ratnesh Sharma, Fremont, CA (US); Amirsaman Arabali, San Jose, CA (US)

(73) Assignee: NEC Corporation (JP)

( * ) Notice: Subject to any disclaimer, the term of this patent is extended or adjusted under 35 U.S.C. 154(b) by 323 days.

(21) Appl. No.: 15/228,670

(22) Filed: Aug. 4, 2016

(65) Prior Publication Data

US 2017/0038786 A1 Feb. 9, 2017

Related U.S. Application Data

(60) Provisional application No. 62/200,675, filed on Aug. 4, 2015.

(51) Int. Cl.
*G05F 1/00* (2006.01)
*G05F 1/66* (2006.01)
*G05B 15/02* (2006.01)

(52) U.S. Cl.
CPC ............... *G05F 1/66* (2013.01); *G05B 15/02* (2013.01)

(58) Field of Classification Search
None
See application file for complete search history.

(56) References Cited

U.S. PATENT DOCUMENTS

2013/0190938 A1* 7/2013 Zadeh ................. H02J 13/0013 700/291
2014/0244056 A1* 8/2014 Pena ......................... F02C 1/00 700/287
2015/0286200 A1* 10/2015 Eger ......................... H02J 3/32 700/295
2015/0295452 A1* 10/2015 Dyer ......................... H02J 7/34 307/23

OTHER PUBLICATIONS

IR 14024 B. Asghari, R. Sharma, "Dynamic co-optimization method for grid-scale energy storage system (GSESS) market participation," (pp. 1-7).

(Continued)

*Primary Examiner* — Paul B Yanchus, III
(74) *Attorney, Agent, or Firm* — Joseph Kolodka

(57) ABSTRACT

A system and method for management of one or more grid-scale Energy Storage Systems (GSSs), including generating an optimal GSS schedule in the presence of frequency regulation uncertainties. The GSS scheduling includes determining optimal capacity deployment factors to minimize penalties for failing to provide scheduled energy and frequency regulation up/down services subject to risk constraints; generating a schedule for a GSS unit by performing co-optimization using the optimal capacity deployment factors, the co-optimization including tracking upper and/or lower bounds on a state of charge (SoC) and including the bounds as a hard constraints; and calculating risk indices based on the optimal scheduling for the GSS unit, and outputting an optimal GSS schedule if risk constraints are satisfied. A controller charges and/or discharges energy from GSS units based on the generated optimal GSS schedule.

20 Claims, 5 Drawing Sheets

(56) References Cited

OTHER PUBLICATIONS

Byrne, R. H. et al., "Potential Revenue from Electrical Energy Storage in the Electricity Reliability Council of Texas (ERCOT)," "Potential revenue from electrical energy storage in the Electricity Reliability Council of Texas (ERCOT)," IEEE PES General Meeting Conference & Exposition, Jul. 2014. (pp. 1-5).

* cited by examiner

300

400

MANAGEMENT OF GRID-SCALE ENERGY STORAGE SYSTEMS

RELATED APPLICATION INFORMATION

This application claims priority to provisional application No. 62/200,675 filed Aug. 4, 2015, the contents of which are incorporated herein by reference.

BACKGROUND

Technical Field

The present invention relates generally to management of Grid Scale Energy Storage (GSS) units, and more particularly, to management of GSS unit operations in energy and frequency regulation markets in the present of uncertainties and hard constraints.

Description of the Related Art

Grid Scale Energy Storage (GSS) units participate in the day-ahead electricity markets to provide energy and Frequency Regulation (FR) services. In real time, GSS units are required to provide the scheduled power for an entire one-hour interval to provide energy service and follow the FR signal to provide regulation-up/down services. The FR signal is totally random and changes often (e.g., every 4 seconds). Therefore, there is no guarantee that the FR up/down capacities offered by GSS units are actually deployed. For example, a GSS unit might be committed to provide a certain amount of regulation down services in the day-ahead market but following the FR signal in real-time may force the GSS unit to provide more/less FR down services. It is important for storage-based resources to track how much energy/power they need to charge/discharge, as their energy levels, which are tied to their charging/discharging powers, are limited. The uncertainties in the operation of GSSs at any current time may affect their state of charge (SoC) at later hours, as the state of charge at the current moment is a recursive function of the charging/discharging powers in previous times, and consequently the GSSs may violate the limitations.

In situations where a GSS unit meets its upper/lower limits, two cases may traditionally occur. In the first case, the GSS stops operating and stops providing the scheduled services that it is committed to provide. This may affect the power system quality when the GSS unit does not meet its commitments. In the second case, the GSS may still continue providing the scheduled services beyond its limitations. However, this may adversely affect the life time of the GSS unit in this situation (e.g., when it is operating under its minimum state of charge constrain). Therefore, in either case there are power quality issues and/or energy storage lifetime issues using conventional systems and methods.

Moreover, not providing the scheduled services significantly reduces the revenues obtained from the participation of GSS units in markets due to, for example, assigned penalties for the scheduled energy not met. This situation becomes more stringent when GSS units are required to provide pre-determined regulatory charging/discharging power for the power grid reliability and investment deferral. In this situation, not providing the regulatory power may lead to equipment overload and increase the likelihood of equipment failure, consequently causing reduced reliability of power grids.

SUMMARY

A computer implemented method for management of one or more grid-scale Energy Storage Systems (GSSs), including generating an optimal GSS schedule in the presence of frequency regulation uncertainties. The GSS scheduling further includes determining optimal capacity deployment factors to minimize penalties for failing to provide scheduled energy and frequency regulation up/down services subject to risk constraints; generating a schedule for a GSS unit by performing co-optimization using the optimal capacity deployment factors, the co-optimization including tracking upper and/or lower bounds on a state of charge (SoC) and including the bounds as a hard constraints; and calculating risk indices based on the optimal scheduling for the GSS unit, and outputting an optimal GSS schedule if risk constraints are satisfied. Energy is charged and/or discharged to or from one or more GSS units based on the generated optimal GSS schedule.

A system for management of one or more grid-scale Energy Storage Systems (GSSs), including a scheduler for generating an optimal GSS schedule in the presence of frequency regulation uncertainties. The scheduler is further configured to determine optimal capacity deployment factors to minimize penalties for failing to provide scheduled energy and frequency regulation up/down services subject to risk constraints; generate a schedule for a GSS unit by performing co-optimization using the optimal capacity deployment factors, the co-optimization including tracking upper and/or lower bounds on a state of charge (SoC) and including the bounds as a hard constraints; and calculate risk indices based on the optimal scheduling for the GSS unit and outputting an optimal GSS schedule if risk constraints are satisfied. A controller charges and/or discharges energy from GSS units based on the generated optimal GSS schedule.

A computer-readable storage medium including a computer-readable program for management of one or more grid-scale Energy Storage Systems (GSSs), wherein the computer-readable program when executed on a computer causes the computer to perform the steps of generating an optimal GSS schedule in the presence of frequency regulation uncertainties. The GSS scheduling further includes determining optimal capacity deployment factors to minimize penalties for failing to provide scheduled energy and frequency regulation up/down services subject to risk constraints; generating a schedule for a GSS unit by performing co-optimization using the optimal capacity deployment factors, the co-optimization including tracking upper and/or lower bounds on a state of charge (SoC) and including the bounds as a hard constraints; and calculating risk indices based on the optimal scheduling for the GSS unit, and outputting an optimal GSS schedule if risk constraints are satisfied. Energy is charged and/or discharged to or from one or more GSS units based on the generated optimal GSS schedule.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
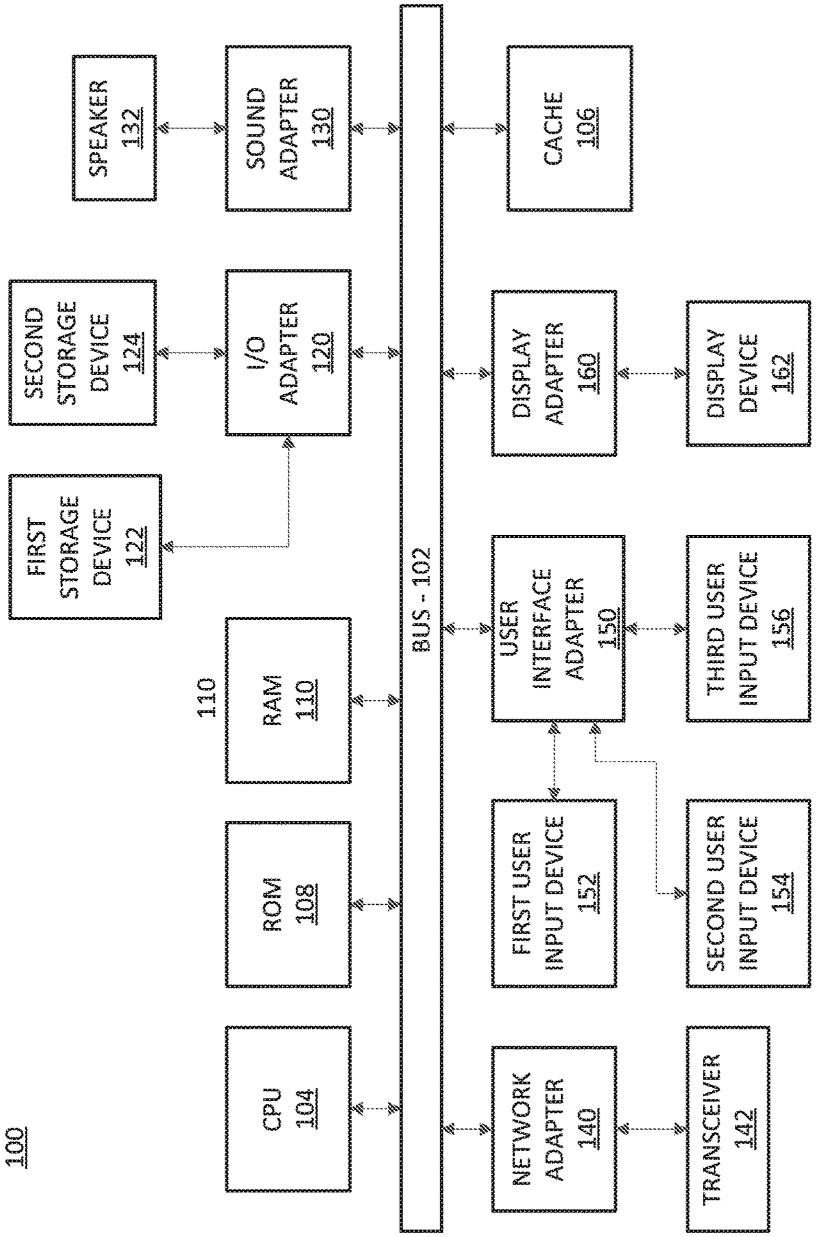
FIG. 1 is a block/flow diagram illustrating an exemplary processing system to which the present principles may be applied, in accordance with the present principles.

In accordance with the present principles, systems and methods are provided for management and control of grid-scale energy storage (GSS) units using a generated co-optimization model to improve GSS reliability and reduce energy costs according to various embodiments.

In a particularly useful embodiment, the present principles may be employed for management of GSS units to maximize revenue and performance of GSS units based on co-optimization for energy and Frequency Regulation (FR) markets in the presence of regulation uncertainties. In some embodiments, the present principles may be employed to increase revenue of GSSs which participate in day-ahead markets by significantly reducing any possible penalties resulting from not fulfilling day-ahead commitments to provide energy and FR services, as well as regulatory charging and discharging powers. Furthermore, the system and method according to the present principles increases the lifetime of GSSs by preventing GSSs from violating operational limits. In one embodiment, the system and method according to the present principles may be employed to schedule grid scale storage operations in energy and FR markets in the present of uncertainty and hard constraints.

GSS units can participate in day-ahead electricity markets to provide energy and FR services to the grid. The uncertainties in real-time FR signal can result in inability of GSS units to provide the FR service according to the market schedule due to their limited energy and power capacities. In one embodiment, a new co-optimization model according to the present principles may be employed to determine and provide the optimal schedule for a GSS unit to maximize its revenue and functionality in, for example, day-ahead energy and FR markets, while fulfilling its commitments with a high confidence level. The uncertainties in the FR signal may be captured by defining two pairs of capacity deployment factors (e.g., capacity up, capacity down). In some embodiments, the present principles may also include duty cycle-based charging/discharging patterns that GSS units may follow to provide investment deferral services to the grid.

GSS units can generate revenue for their owners by participating in different electricity markets. In the energy market, there is an opportunity for energy arbitrage by purchasing energy during low load times and selling it back during peak load hours when energy prices increase. In ancillary service markets, GSS units can offer different services such as FR up/down and reserves. In one embodiment, total benefits obtained from different services offered by GSS units may be maximized while meeting the GSS limits and requirements. This is especially important when there are some degrees of uncertainties in the market operation, as GSS units can participate in day-ahead electricity markets to provide energy and FR services, and they are awarded based on the capacities and prices they bid.

In real time, GSS units have to provide the scheduled power for the entire one-hour interval to provide energy service for that interval and follow the FR signal to provide FR up/down services. The FR signal may change randomly every 4 seconds, and therefore, there is no guarantee that full FR up/down capacities offered by GSS units are actually deployed in real-time in conventional systems. The uncertainties in the real-time operation of a GSS unit may affect its state of charge (SoC) at later hours, as the SoC at each moment is a recursive function of charging/discharging powers in previous time steps, and consequently the GSS unit may reach its energy capacity limits. When a GSS unit reaches its upper/lower energy capacity limits, it may not be able to deliver the scheduled FR up/down and charging/discharging energy services to the grid anymore. This may affect the power system quality since the GSS unit cannot satisfy its commitments. Furthermore, not providing the scheduled services may reduce revenue of a GSS unit due to, for example, its poor performance in the market.

Investment deferral is another application of GSS units for transmission and distribution networks. Utilities can use GSS units to defer otherwise necessary investments required to upgrade substations, transformers and transmission lines. Utilities require GSS units to have certain time-based charging/discharging patterns for specific periods in a day to maintain the network reliability level, and thus, GSS owners have to ensure that they can provide the required power for the specific duration according to utility's guidelines. Conventional systems and methods have attempted to maximize revenue and functionality of GSSs in day-ahead markets, but do not account for the effect of uncertainties in the deployed FR up/down capacities in prior hours on the performance of GSS units.

In one embodiment, a GSS market co-optimization model which accounts for the uncertainty of FR signals in its framework may be employed according to the present principles. To account for uncertainties of FR signals, two pairs of capacity deployment factors (e.g., capacity up, capacity down) may be defined to capture the uncertainties in FR services. These factors may then be used in the co-optimization to model the upper/lower bounds on the SoC of the GSS unit. The co-optimization method may track the upper/lower bounds instead of the actual SoC to make sure that the bounds do not violate the maximum/minimum SoC requirements. The duty cycle-based charge/discharge patterns may also be included in the co-optimization by adding hard constraints to the problem according to various embodiments of the present principles, which will be described in further detail herein below.

In an embodiment, co-optimization (e.g., real-time co-optimization) is employed to meet energy demands (e.g., energy market) and to meet reserve requirements (e.g., reserve markets) by co-optimization of the energy markets and reserve markets to minimize overall costs and maximize performance and lifetime of GSS units. Co-optimization according to the present principles may be employed to meet energy demands at a minimum cost while maintaining system reliability. In an embodiment, co-optimization may be employed to schedule the GSS charge and discharge operations to maximize GSS revenue from participating in energy market and reserve markets (e.g., frequency regulation (FR) market). Co-optimization according to the present principles may maximize ESS revenue from participating in different markets while maximizing GSS unit performance.

Developing a co-optimization model for maximizing the revenue from participating energy storage units in the day-ahead markets has been the topic of several studies. However, conventional systems and methods are not capable of effectively accounting for the uncertainties of regulation up/down services for energy storage devices. For example, one study has added several constraints to the co-optimization to ensure that energy storage units have enough energy stored in their reservoirs when they are providing regulation-up/down services. But, it has not addressed the effects of uncertainties in the deployed regulation-up/down capacities in prior hours and as the result the schedule may become infeasible during some periods. Another study has considered the average deployments for regulation-up/down capacities using the historical regulation signal.

However, the average value is not sufficiently accurate and the risk that energy storage units violate their limitations is still fairly high, as the average capacity deployments do not exactly occur most of the time. Also, the effects of uncertainties in the regulatory charging/discharging power on the state of charge of storage units have not been studied yet. Moreover, the mixed operation of GSSs to participate in the markets while providing regulatory charging/discharging patterns for the reliability proposes has not been addressed by any conventional systems or methods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 5:
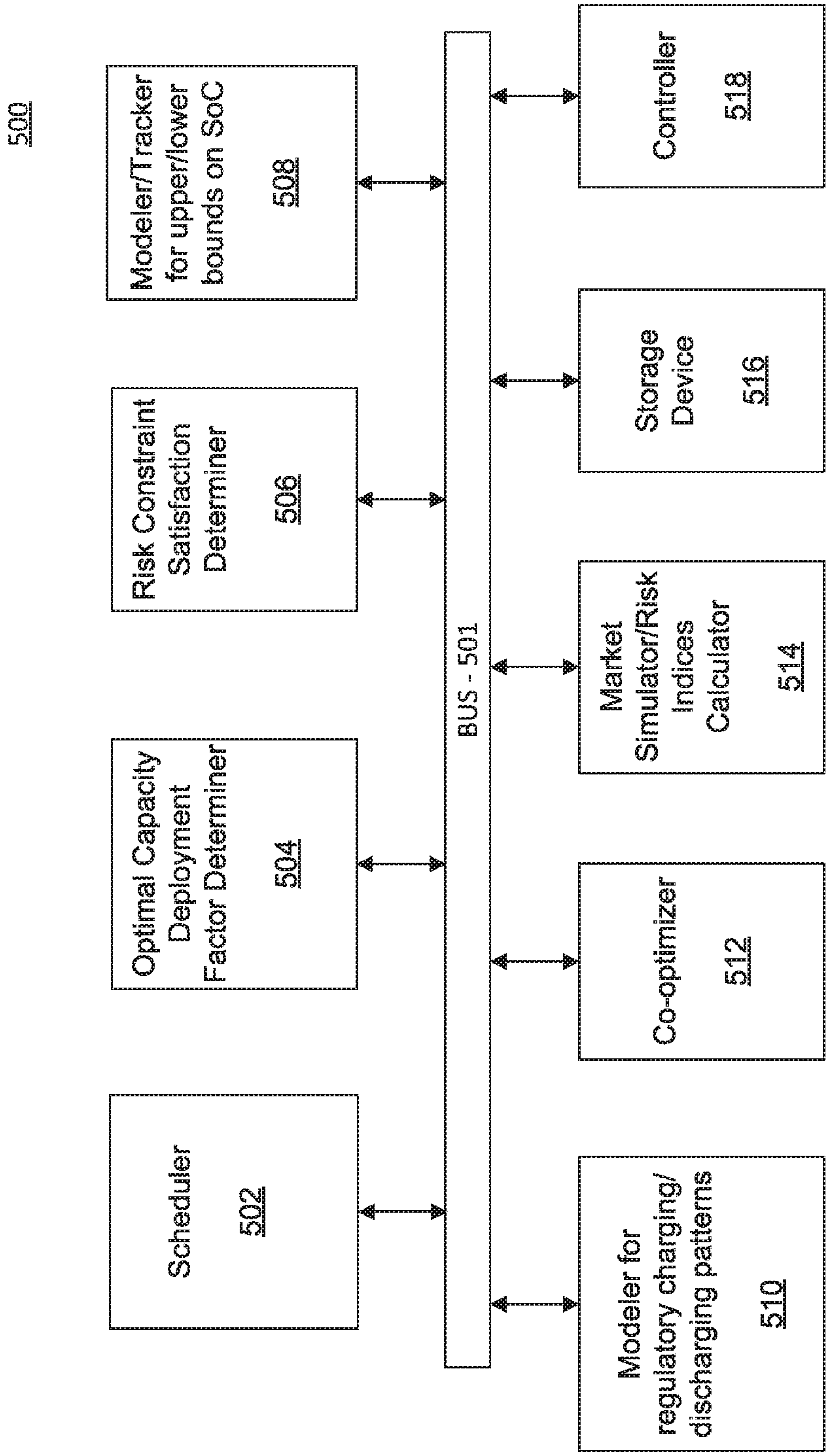
FIG. 5 shows an exemplary system for management of grid scale energy storage (GSS) units in the presence of regulation uncertainties and hard constraints, in accordance with an embodiment of the present principles.

Moreover, it is to be appreciated that systems 100 and 500, described below with respect to FIGS. 1 and 5, respectively, are systems for implementing respective embodiments of the present principles. Part or all of processing system 100 may be implemented in one or more of the elements of system 500 according to various embodiments of the present principles.

Figure 2:
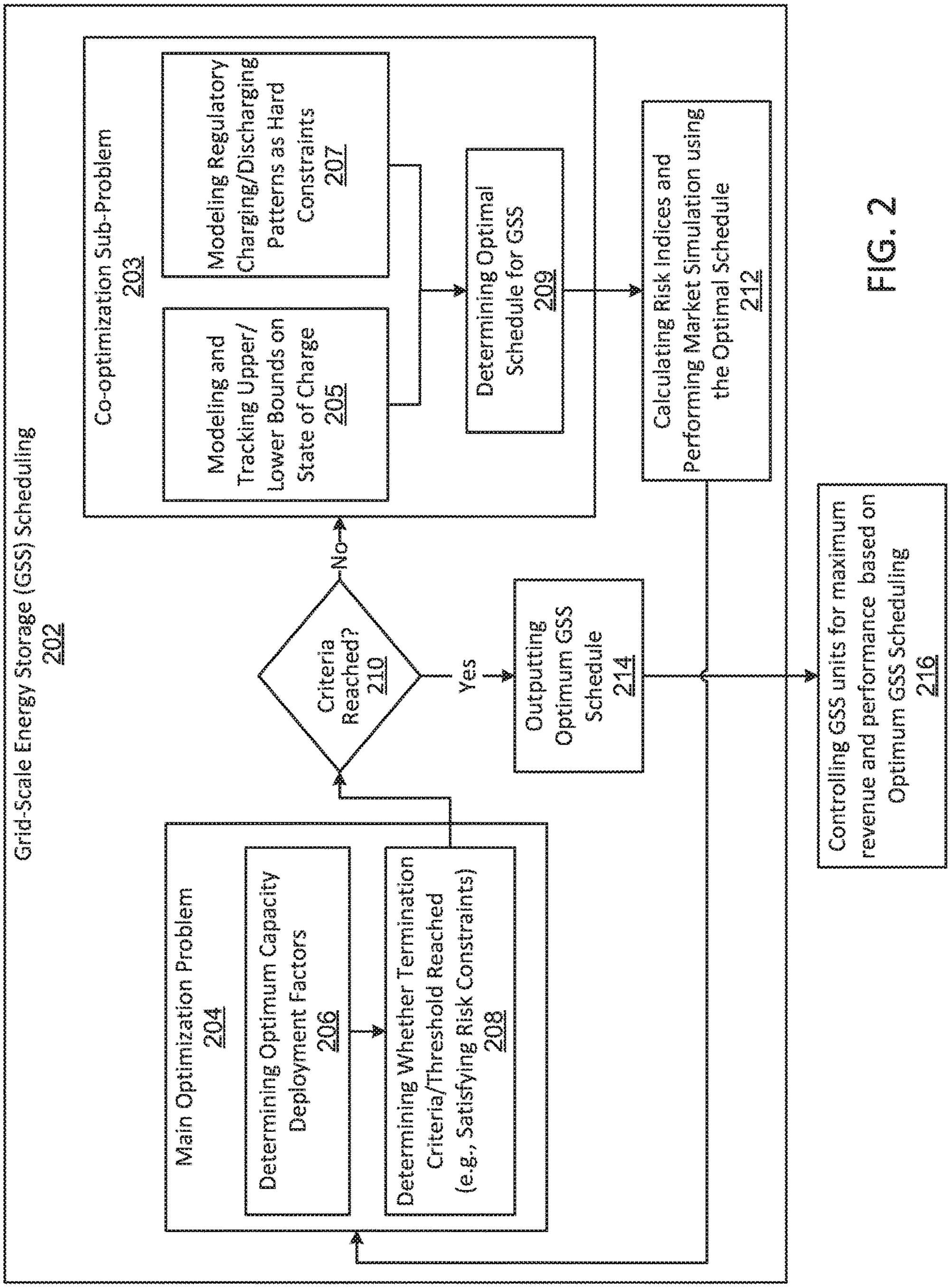
FIG. 2 is a block/flow diagram illustrating a method 200 for management of grid scale energy storage (GSS) units in the presence of regulation uncertainties and hard constraints, in accordance with an embodiment of the present principles.

Further, it is to be appreciated that processing system 100 may perform at least part of the method described herein including, for example, at least part of method 200 of FIG. 2. Similarly, part or all of system 500 may be used to perform at least part of method 200 of FIG. 2 according to various embodiments of the present principles.

Referring now to FIG. 2, a block/flow diagram of a method 200 for management of grid scale energy storage (GSS) units in the presence of regulation uncertainties and hard constraints is illustratively depicted in accordance with an embodiment of the present principles.

In one embodiment, optimal GSS schedules may be determined for participation in day-ahead energy and Frequency Regulation (FR) markets in block 202, and real time control of frequency regulation services for GSS units may be performed in block 230 based on the optimum schedules determined in block 202. A plurality of parameters related to energy market, network, and/or GSS operations may be measured or received according to various embodiments, and may be employed as input for the GSS management and optimization method 200 according to the present principles.

To participate in day-ahead markets, users/owners of GSS units may submit energy bids to market operators prior to the beginning of each day. In one embodiment, the method 200 may be employed to maximize GSS revenue while satisfying GSS requirements (e.g., energy demands; requirements; requests; etc.) by scheduling in block 202 based on the co-optimization performed in accordance with the present principles. In an embodiment, co-optimization in block 205 may include optimizing in a plurality of markets (e.g., energy market, frequency regulation market, voltage regulation market, etc.) rather than, for example, optimizing just a single market for the next day.

In one embodiment, the present principles may be employed for optimal GSS scheduling in block 202 for participation in day-ahead energy markets while satisfying GSS commitments and requirements in the presence of regulation uncertainties and hard constraints. In some embodiments, the scheduling 202 may include solving a main problem 204 and a sub-problem 203. The main problem 204 may include determining optimal capacity deployment factors by minimizing the penalty for not providing the scheduled services in block 206, and checking if risk constraints are satisfied in block 208 in accordance with the present principles.

For example, in one embodiment, penalties associated with not providing scheduled energy and regulation up/down services may be minimized in block 206 by determining two pairs of optimal capacity deployment factors for regulation up and down services subject to risk constraints (e.g., uncertainty in real-time frequency regulation up and regulation down signals) in block 208, in accordance with the present principles. In some embodiments, after all iterations complete, the method 200 minimizes penalties by controlling GSS units according to the optimal schedule determined during scheduling 202 to ensure requirements of the GSS units are met.

In one embodiment, the co-optimization sub-problem 203 may be employed to determine an optimal schedule for one or more GSS units by performing co-optimization in block 205. The co-optimization in block 203 may include modeling and tracking upper/lower bounds on the state of charge (SoC) in block 205, and modeling regulatory charging/discharging patterns in block 209. The optimal scheduling determination in block 202 may include iteratively solving the main problem 204 and the sub-problem 203 by first solving the main problem 204, and using the results from the main problem 204 in the sub-problem 203. The results of the sub-problem 203 may then be used in the main problem 204, and iterations may continue until a termination criteria is determined to be reached (e.g., predetermined number of iterations, satisfaction of risk constraints to a particular confidence level, etc.) in block 208. The confidence level may be equal to one minus the probability of one or more GSS units not providing the committed schedule in the market in accordance with the present principles.

In one embodiment, solving the main optimization problem 204 includes determining optimal capacity deployment factors in block 206 and checking risk constraints for possible violations in block 208. Risk constraints may be determined by the probability of one or more GSS units not providing the scheduled energy and FR services to the grid. Violations may occur if energy storage reaches its minimum or maximum SoC, and thus can no longer operate according to a particular schedule. In accordance with various embodiments of the present principles, several different methods may be employed to solve the main problem 204 (e.g., a random selection of capacity factors; an intuitive selection of capacity factors; an optimized selection of capacity factors to minimize the penalty associated with not providing the scheduled services, etc.).

In one embodiment, the optimal capacity deployment factors may be used in the co-optimization sub-problem 203 to find the upper and lower bounds on the state of charge (SoC) of a GSS unit in block 205. These factors may capture all the uncertainties in the regulation services and reflect the minimum/maximum hourly capacity deployments for regulation-up and -down in accordance with various embodiments of the present principles.

In block 205 the upper and lower bounds on the SoC may be modeled by considering the worst case scenarios for charging/discharging using appropriate capacity deployment factors (e.g., by calculating two pairs of optimal capacity factors, where one pair may be used in the equation for upper bound on SoC and the other pair may be used in the equation for lower bound on SoC), in accordance with the present principles. In one embodiment, rather than tracking an actual state of charge, the upper and lower bounds for the SoC are tracked, and a controller may be employed to ensure that those bounds do not violate the maximum/minimum SoC boundaries. This may be performed by modeling regulatory charging/discharging patterns as hard constraints in block 207, and including them in the co-optimization sub-problem. This way, the actual state of charge of the GSS remains within its limits throughout the whole optimization (e.g., because it lies between those bounds whether the scheduled regulation capacities are deployed or not).

In one embodiment, the regulatory charging/discharging patterns are also included in the co-optimization model as hard constraints in block 207 to evaluate the mixed mode operation of GSSs. This ensures us that there is enough energy stored in the reservoir to provide the regulatory charging/discharging patterns (e.g., in a risky environment).

In one embodiment, the optimal schedule for the GSS may be determined by co-optimization in block 209, and may be employed in block 212 to calculate the risk indices in the main optimization problem 204. In block 212, a statistical analysis may be performed to find the distribution of the regulation signal. Scenarios (e.g., different realizations of a regulation signal based on the statistical analysis) may be generated based on the distribution for the regulation signal, and the scenarios may be used to calculate the risk indices for the main problem 204. The scheduling in block 202 may include iteratively solve the main problem 204 and the sub-problem 203, and may terminate once the risk constraints are determined to be satisfied with a certain confidence level in block 208 in accordance with the present principles.

If a termination criteria/threshold has been reached in block 210 (e.g., risk constraints are satisfied), the optimum GSS schedule may be output in block 214, and GSS units may be controlled based on the optimum GSS schedule to generate maximum revenue and performance in block 216 in accordance with the present principles.

In one embodiment, the method 200 for maximizing revenue earned by a GSS unit may include formulating a co-optimization problem to determine optimum GSS scheduling in block 202. In accordance with the present principles, a GSS unit can take advantage of arbitrage in the energy market to purchase/store energy from the network when the energy price is low and sell it back to the network when the price is high.

In some embodiments, the GSS unit can participate in the Frequency Regulation (FR) market to provide FR up/down services. The following objective function may be employed to calculate the total revenue from the energy and FR up/down services:

$$\max\sum_{h=1}^{T}\left[\hat{\lambda}_e(h)P_S^e(h)+\left(\hat{\lambda}_{ru}(h)+k_{ru}\hat{\lambda}_e(h)\right)P_S^{ru}(h)+\left(\hat{\lambda}_{rd}(h)-k_{rd}\hat{\lambda}_e(h)\right)P_S^{rd}(h)\right] \quad (1)$$

where $\hat{\lambda}_e$, $\hat{\lambda}_{ru}$ and $\hat{\lambda}_{rd}$ are estimated energy, FR up and down prices, respectively. $P_S^e$, $P_S^{ru}$ and $P_S^{rd}$ are the power sold/purchased in energy market (positive/negative power means discharging/charging), FR up capacity and FR down capacity of the GSS unit. $k_{ru}$ and $k_{rd}$ are the capacity deployment percentages for FR up and FR down services (e.g., calculated by integrating the FR up/down signals over an appropriate period of time (e.g., hourly in this co-optimization as there is an hourly time step).

For ease of illustration, it may be assumed herein that the market price forecasts are accurate, and as such, only uncertainties in real-time FR signal are addressed. In an actual market, the GSS units have to follow the FR signal in order to provide FR services. The FR signal changes randomly at each four-second interval. Therefore, there is no guarantee that the FR capacities awarded and offered are actually deployed. In some embodiments, $k_{ru}$ and $k_{rd}$ reflect the deployment of FR capacities.

In one embodiment, the SoC of a GSS unit can be calculated by:

$$E_s(h)=(1-\xi)E_s(h-1)-\eta(P_S^e(h)+k_{ru}P_S^{ru}(h)-k_{rd}P_S^{rd}(h)) \quad (2)$$

where, $E_s$, $\xi$ and $\eta$ are the SoC (MWh), self-discharge, and round trip efficiency. The total discharging power must be smaller than the maximum discharging power ($P_{max}$). Note that although the regulation-up capacity ($P_S^{ru}$) may not be deployed for the entire one-hour interval, it affects the GSS capacity in the energy market ($P_S^e$) which must be provided and deployed for the entire interval.

In one embodiment, the total discharging power constraint is given by:

$$P_S^e(h)+P_S^{ru}(h)\le P_{max} \quad (3)$$

Similarly, the total charging power must be greater than the maximum charging power ($-P_{max}$).

$$P_S^e(h)-P_S^{rd}(h)\ge -P_{max} \quad (4)$$

The amount of stored energy (MWh) in a GSS unit and its power are limited by:

$$E_{min}\le E_s(h)\le E_{max},\ -P_{max}\le P_S^e(h)\le P_{max} \quad (5)$$

Equations (1)-(5) above have been presented for illustrative purposes, and have been used as co-optimization models in conventional methods to account f or partial deployment of FR up/down capacities that give the optimal schedule for energy as well as FR up/down capacities. In real time, it is assumed that the GSS has the capability to track the FR signal provided by an independent system operator (ISO). However, using conventional methods which follow the FR signal may cause the optimal schedule to become infeasible for some intervals as the signal is stochastic.

Figure 3:
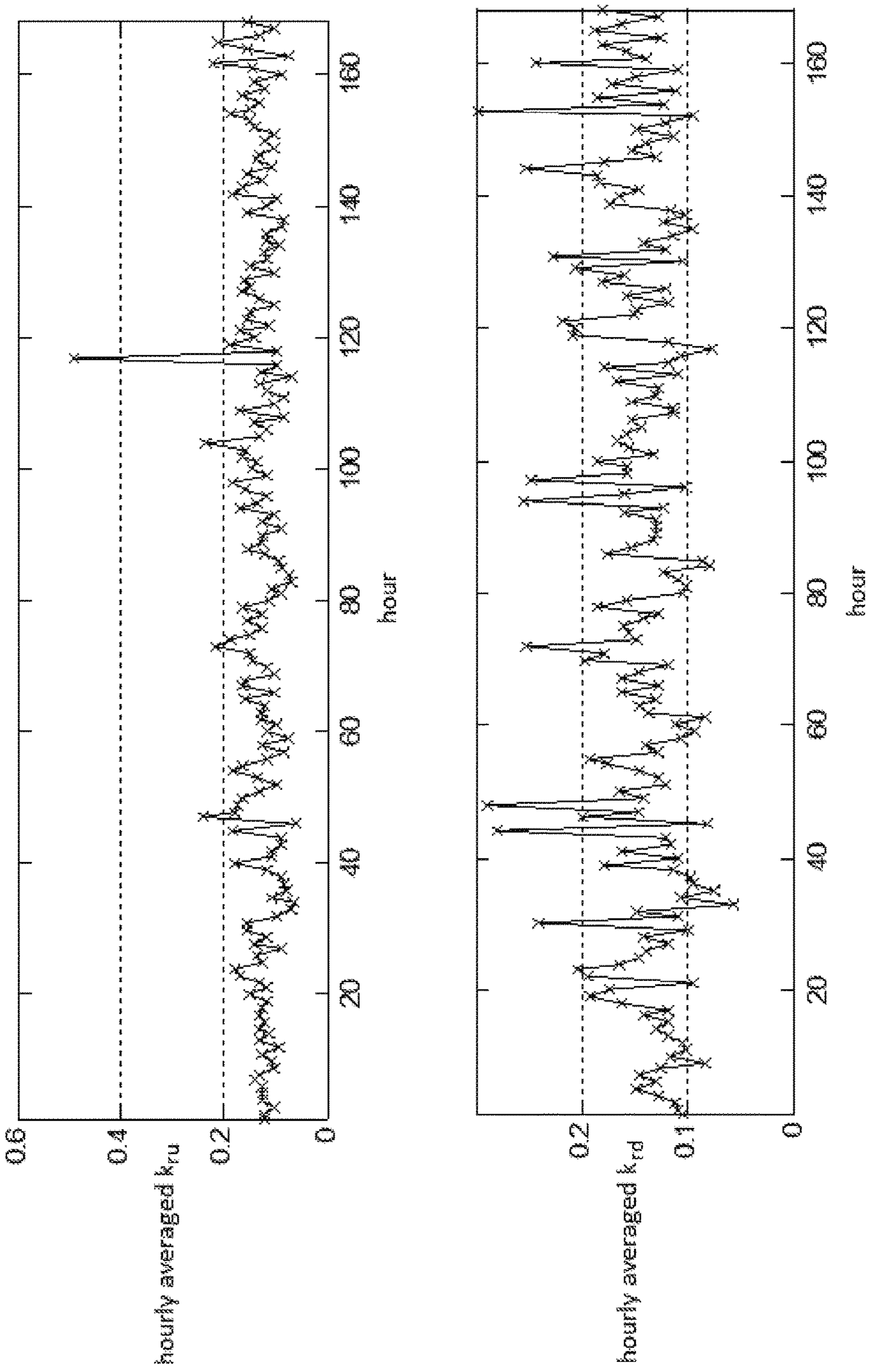
FIG. 3 shows a graph of the hourly averaged Frequency Regulation (FR) up percentage ($k_{ru}$) and FR down percentage ($k_{rd}$) of a sample FR signal for a week, in accordance with an embodiment of the present principles.

For example, referring now to FIG. 3, a graph 300 of the hourly averaged $k_{ru}$ and $k_{rd}$ of a sample FR signal for a week is illustratively depicted. Maximum $k_{ru}$ is 0.491 (second maximum is 0.2392) and its minimum is 0.0586. Maximum $k_{rd}$ is 0.2995 and its minimum is 0.0562. As shown, the hourly averaged capacity deployment factors randomly change. Therefore, in equation (2), $k_{ru}$ and $k_{rd}$ are with some degrees of uncertainty and change randomly (e.g., in the range of 0 (no deployment) and 1 (full deployment)) based on the FR signal. These uncertainties may affect the SoC and consequently it may violate the boundaries in (5) (e.g., during intra hour), although the hourly schedule may not violate the constraints.

Figure 4:
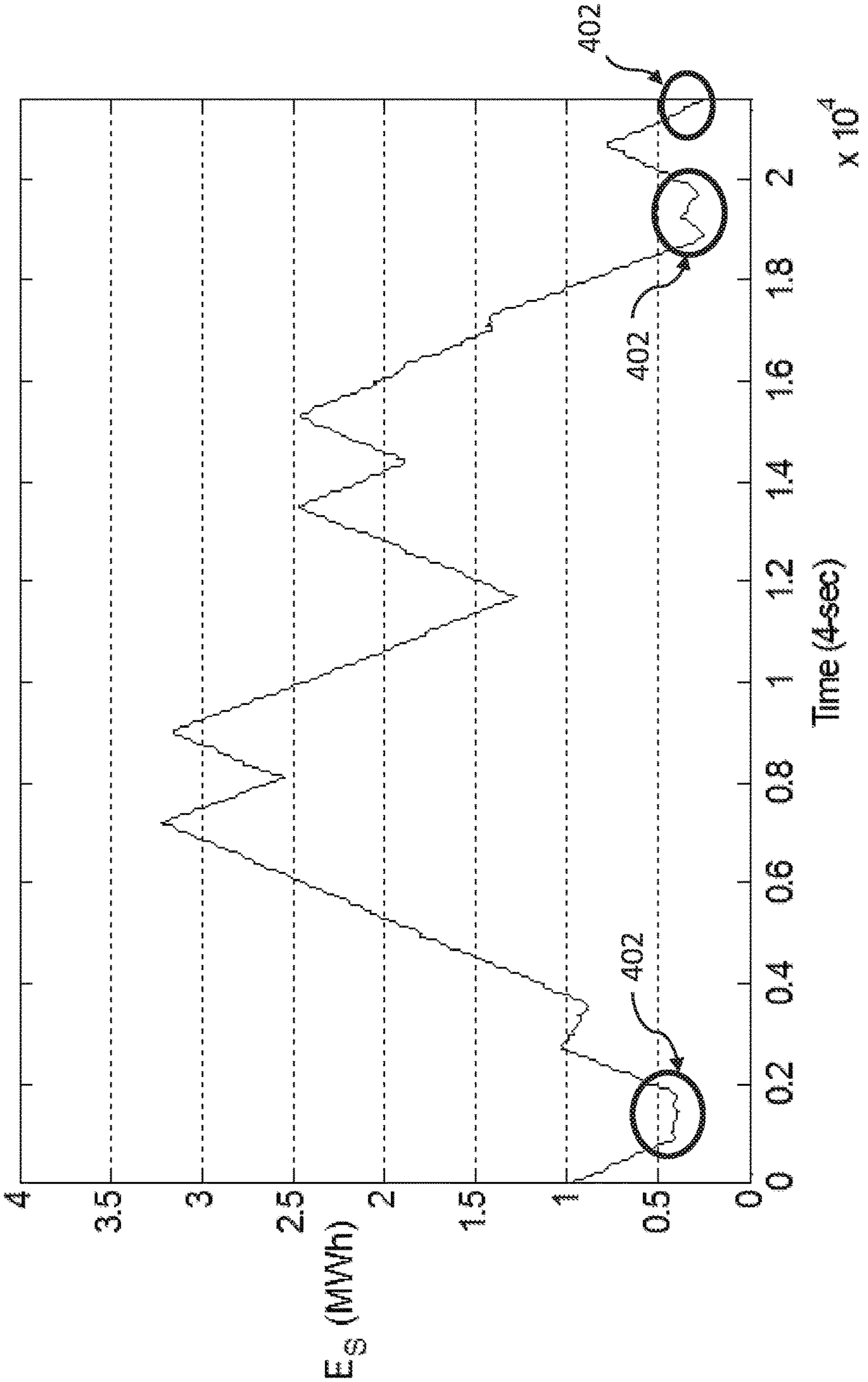
FIG. 4 shows a graph of a 4-second (4-sec) State of Charge (SoC) simulation using an actual Frequency Regulation (FR) signal, in accordance with an embodiment of the present principles.

Referring now to FIG. 4, a graph 400 of a 4-second (4-sec) SoC simulation using an actual FR signal is illustratively depicted. The exemplary graph 400 shows the 4-sec SoC profile of a 4 MWh, 1 MW GSS unit which participates in the day-ahead energy and FR markets and is optimized using equations (1)-(5). The SoC profile is simulated using an actual 4-sec FR signal with average $k_{ru}$=0.1391 and $k_{rd}$=0.1559 when following the co-optimized schedule from (1)-(5). The minimum allowed SoC is assumed to be %12.5 (0.5 MWh).

As shown in this figure in circled areas 402, the SoC violates the minimum allowed SoC at some intervals (e.g., 402). This occurs because the average deployment factors are not the same every day, and also because there is no exact information on deployment factors available in advance.

In one embodiment according to the present principles, to characterize these uncertainties, the co-optimization subproblem 203 may be employed to find the lower and upper bounds on the SoC in equation (2) in block 205. The present principles may be employed to advantageously track lower/upper bounds on the SoC of the GSS unit in the co-optimization problem instead of tracking the actual SoC in accordance with various embodiments.

In block 205, equations (6.a) and (6.b) may be defined to represent the upper and lower bounds for the SoC of a GSS unit as follows:

$$E_{lb}(h)=(1-\xi)E_{lb}(h-1)-\eta(P_S^e(h)+k_{ru\_max}P_S^{ru}(h)-k_{rd\_min}P_S^{rd}(h)) \quad (6.a)$$

$$E_{ub}(h)=(1-\xi)E_{ub}(h-1)-\eta(P_S^e(h)+k_{ru\_min}P_S^{ru}(h)-k_{rd\_max}P_S^{rd}(h)) \quad (6.b)$$

In one embodiment, the FR up power decreases the SoC and FR down only increases the SoC. Therefore, the lower bound on the SoC (6.a) occurs when the FR down deployment percentage ($k_{rd}$) is at its minimum value ($k_{rd\_min}$) and the FR up deployment percentage ($k_{ru}$) is at its maximum value ($k_{rd\_max}$) for the entire simulation period. In the worst case, $k_{rd\_min}$ is zero, meaning that the FR down power ($P_S^{rd}$) is not provided to increase the SoC.

In one embodiment, in block 205, the upper bound on the SoC (6.b) occurs when $k_{ru}$ is at its minimum value ($k_{ru\_min}$) and $k_{rd}$ is at its maximum value ($k_{rd\_max}$) for the entire simulation period. In the worst case, $k_{ru\_min}$ is zero meaning that the regulation-up power $P_S^{ru}$ is not provided to decrease the SoC throughout the entire period. The actual SoC of the storage unit lies between the upper/lower bounds. Now, the present principles may be employed to ensure that $E_{ub}$ and $E_{lb}$ do not violate the maximum and minimum energy capacities of the GSS unit as follows:

$$E_{lb}(h) \geq E_{min}, E_{ub}(h) \leq E_{max} \tag{7}$$

In block 202, the co-optimization performed during GSS scheduling in block 202 may include replacing equation (2) and the first part of equation (5) by equations (6) and (7), respectively, according to various embodiments of the present principles. The objective function may be the average revenue over the entire day and may take the following form:

$$\max \sum_{h=1}^{T} \left[\hat{\lambda}_e(h) P_S^e(h) + \left(\hat{\lambda}_{ru}(h) + \overline{k_{ru}}\hat{\lambda}_e(h)\right) P_S^{ru}(h) + \left(\hat{\lambda}_{rd}(h) - \overline{k_{rd}}\hat{\lambda}_e(h)\right) P_S^{rd}(h)\right] \tag{8}$$

where, $\overline{k_{ru}}$ and $\overline{k_{rd}}$ are averaged percentages of FR capacity deployments, in accordance with the present principles.

In some embodiments, there may exist specific daily required power and charge/discharge durations from a GSS unit (e.g., for investment deferral purposes). These requirements can be modeled by adding more constraints on the GSS charging/discharging power in the co-optimization performed during the scheduling in block 202 in accordance with the present principles.

In one embodiment, to include the duty cycle-based charging/discharging patterns, we need to define $P_D(h)$ as the duty cycle-based charging/discharging power provided by the GSS unit at time h and $P_m^e(h)$ as the charging/discharging power provided by the GSS unit for participating in the day-ahead energy market. $P_D(h)$ is a vector of constant numbers and predetermined by the utility to meet the reliability requirements for investment deferral. The constant and total powers of a GSS unit can be written as:

$$P_S^e(h) = P_m^e(h) + P_D(h) \tag{9.a}$$

$$P_S(h) = P_S^e(h) + P_S^{ru}(h) + P_S^{rd}(h) \tag{9.b}$$

In one embodiment, to exclude the duty cycle-based power from the market revenue in the co-optimization, $P_S^e(h)$ is replaced with $P_m^e(h)$ in (8). In the current practice, GSS units are not allowed to participate in the market during duty cycle-based charging/discharging periods. However, in accordance with the present principles, this requirement can be satisfied by setting $P_m^e(h) = P_S^{ru}(h) = P_S^{rd}(h) = 0$ in the co-optimization model during these periods.

For illustrative purposes, case studies employing the co-optimization model according to various embodiments of the method 200 according to the present principles will be presented herein below. In one embodiment, the developed co-optimization model may be used to schedule, for example, a 4 MWh, 1 MW GSS unit for operation in the day-ahead market. The co-optimization results from the scheduling in block 202, scheduled power, and FR up/down capacities, are used to simulate the SoC of the GSS unit for a 24-hour period. The market price data is obtained from the CAISO website for Jan. 17, 2015. A minimum SoC of 0.5 MWh is assumed for the unit and the initial SoC is 1 MWh. Based on the historical regulation signal, $\overline{k_{ru}}$ and $\overline{k_{rd}}$ are 0.1269 and 0.1394. $k_{ru\_max}$, $k_{ru\_min}$, $k_{rd\_ma}$, and $k_{rd\_min}$ are selected equal to 0.20, 0.10, 0.25 and 0.10 to cover 78% and 88% of scenarios for $k_{ru}$ and $k_{rd}$, respectively Case Study I: In this case, we evaluate the performance of the method 200 for reducing the unprovided scheduled services. The SoC of the GSS unit remains between upper and lower bounds for the entire period in accordance with the present principles. Graphs (not shown) which show the simulation results for the developed co-optimization model, the hourly SoC and the upper/lower bounds on the SoC based on the hourly schedule, the scheduled power to participate in the energy market, the scheduled FR up/down capacities to participate in the FR market, and shows the price signals for energy, and FR up and down markets may be constructed and analyzed according to the present principles. Note that the FR down schedule peaks mostly when the discharging power for the energy market peaks. A reason is this practice provides the opportunities to gain the maximum revenue while satisfying equations (3) and (5). Similarly, the FR up and charging power for the energy market simultaneously peak the majority of the time.

Table I (below) shows the probabilities of violating the SoC constraints using our method vs. the method based on the averaged capacity deployment factors for one month FR data. As shown, our method significantly reduces the probability of SoC constraint violations. In other words, the GSS provides its schedules with high level of confidence in the market.

TABLE I

Probabilities of Violating the SoC Limits

| Method | Probability of not providing the schedule |
|---|---|
| Our developed method with ($k_{ru\_max}$, $k_{ru\_min}$, $k_{rd\_max}$, $k_{rd\_min}$) = (0.20, 0.10, 0.25, 0.10) | 0.0011 |
| The method based on average capacity factors | 0.1046 |

Case Study II: In this Case Study, we provide the simulation results using our developed co-optimization model with duty cycle-based charging/discharging patterns. The duty cycle-based discharge starts at t=12 and 17 and lasts for 2 hours and 1 hour, respectively, with 1 MW guaranteed discharging power. The duty cycle-based charge starts at t=14 and 18 and lasts for 2 hours and 1 hour, respectively with −1 MW guaranteed charging power. The participation of the GSS unit in market is not allowed for these hours. The same GSS unit and deployment factors as in Case Study I may be used in this scenario.

Graphs (not shown) which show the simulation results, the hourly SoCs and the upper/lower bounds on the SoC, the scheduled power for energy market and duty cycle-based charging/discharging power, the scheduled FR up/down capacities, and the price signals for energy, FR up and down markets may be constructed and analyzed according to the present principles.

In accordance with an embodiment of the present principles, duty cycle-based charging/discharging power is guaranteed without violating the SoC constraints. Also, during the duty cycle-based hours (e.g., 12-15, 17-18), the power for market and FR up/down are zero since it may be assumed that no market operation is allowed during these hours. Moreover, during the rest of the day, the proposed co-optimization method provides an optimal schedule for the GSS unit to participate in the market In accordance with various embodiments, the method 200 according to the present principles advantageously enables owners of GSS units (e.g., who participate in the day-ahead market) to increase their revenue through significantly reducing the possible penalties resulted from not fulfilling the day-ahead commitments to provide energy and regulation services as well as regulatory charging/discharging powers. The method 200 may also improve the quality of the regulation and reliability services (e.g., by preventing service interruption, equipment failure, etc.). Moreover, the method 200 increases the life-time of GSS units (e.g., by preventing violations of the operational limits). Furthermore, since the optimal GSS scheduling 202 is a deterministic approach, it is much faster than conventional probabilistic approaches, while still effectively modeling uncertainties involved in the regulation signal in accordance with various embodiments of the present principles Referring now to FIG. 5, an exemplary system 500 for management of grid scale energy storage (GSS) units in the presence of regulation uncertainties and hard constraints is illustratively depicted in accordance with an embodiment of the present principles.

While many aspects of system 500 are described in singular form for the sakes of illustration and clarity, the same can be applied to multiples ones of the items mentioned with respect to the description of system 500. For example, while a single storage device 516 is described, more than one storage device 516 can be used in accordance with the teachings of the present principles, while maintaining the spirit of the present principles. Moreover, it is appreciated that the storage device 516 is but one aspect involved with system 500 than can be extended to plural form while maintaining the spirit of the present principles.

The system 500 can include a scheduler 502, an optimal capacity deployment factor determiner 504, a risk constraint satisfaction determiner 506, a modeler/tracker for upper/lower bounds on SoC 508, a modeler for regulatory charging/discharging patterns 510, a co-optimizer 512, a market simulator/risk indices calculator 514, a storage device 516, and/or a controller 518 in accordance with various embodiments.

In an embodiment, the scheduler 502 may include the capacity deployment factor determiner 504 to determine optimal capacity deployment factors subject to risk constraints, and a risk constraint satisfaction determiner 506 which accounts for a plurality of risk constraints. Instead of using the average values for regulation up/down, the modeler/tracker 508 employs two pairs of minimum/maximum capacity deployment factors for use by the modeler 510 for regulation-up/down services to capture the uncertainties in the regulation services.

In one embodiment, the value of the capacity deployment factors are optimized using the co-optimizer 512 such that the risk criteria are satisfied. A statistical analysis may be performed, using the market simulator/risk indices calculator 514, on the historical data to characterize the regulation signal uncertainties, find the distribution and generate scenarios. These scenarios are then used to calculate the risk criteria, and may be stored in the storage device 516. After generating an optimal schedule for GSS units using the scheduler 502, a GSS controller 518 may be employed to control operation of the GSS based on the generated optimized schedule in accordance with various embodiments of the present principles.

In some embodiments, the modeler/tracker 508 may find the upper/lower bounds on the SoC using the capacity deployment factors. Defining these bounds allows us to track them for the worst cases rather than tracking the actual state of charge which is uncertain. These bounds are included in the co-optimizer 512 as hard constraints to make sure they do not violate the minimum/maximum state of charge limits. This way we make sure the actual state of charge remains between the limits even with uncertainties.

In one embodiment, a novel optimal GSS-scheduler 502 may be employed that as the main problem (a) optimizes the capacity deployment factors to minimize the penalty for not providing the scheduled energy and regulation up/down services subject to the risk constraints using the determiner 504, and as the sub-problem (b) solves a new co-optimization using the optimal capacity deployment factors to give the optimal schedule for the GSS using the co-optimizer 512. In the co-optimization, we track, using the modeler/tracker 508, and include the upper/lower bounds on the state of charge as hard constraint to make sure that they do not violate the state of charge limits.

In some embodiments, we also model and include the regulatory charging/discharging patterns as the hard constraints as well as other requirements for a co-optimization using the modeler 510. In the main problem, we use the optimal schedule output from the co-optimizer 512 to find the risk indices and check if the risk constraints are satisfied using the risk constraint satisfaction determiner 506. The scheduler 502 provides the optimal capacities for the GSS to participate in the day-ahead energy and regulation markets while fulfilling the commitments and providing the guaranteed charging/discharging patterns with a certain confidence level. The scheduler 502 also enables evaluation of the impact of regulatory patterns on the market and revenues, and vice versa.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for management of one or more grid-scale Energy Storage Systems (GSSs), comprising:

generating an optimal GSS schedule in the presence of frequency regulation uncertainties, wherein GSS scheduling comprises:

determining optimal capacity deployment factors to minimize penalties for failing to provide scheduled energy and frequency regulation up/down services subject to risk constraints;

generating a schedule for a GSS unit by performing co-optimization using the optimal capacity deployment factors, the co-optimization including tracking upper and/or lower bounds on a state of charge (SoC) and including the bounds as a hard constraints, the upper bounds being defined as $E_{ub}(h)=(1-\xi)E_{ub}(h-1)-\eta(P_S^e(h)+k_{ru\_min}P_S^{ru}(h)-k_{rd\_max}P_S^{rd}(h))$ and the lower bounds being defined as $E_{lb}(h)=(1-\xi)E_{lb}(h-1)-\eta(P_S^e(h)+k_{ru\_max}P_S^{ru}(h)-k_{rd\_min}P_S^{rd}(h))$, wherein $E_{lb}$ is the lower bounds, $E_{ub}$ is the upper bounds, is self-discharge, $\eta$ is round trip efficiency, $P_S^e$ is capacity in an energy market, $k_{ru\_min}$ is a minimum value of an up deployment percentage, $k_{ru\_max}$ is a maximum value of an up deployment percentage, $k_{rd\_min}$ is a minimum value of a down deployment percentage, $k_{rd\_max}$ is a maximum value of a down deployment percentage, $P_S^{ru}$ is regulation-up capacity, and $P_S^{rd}$ is regulation-down capacity; and calculating risk indices based on the optimal scheduling for the GSS unit, and outputting an optimal GSS schedule if risk constraints are satisfied; and charging and/or discharging energy to or from one or more GSS units based on the generated optimal GSS schedule.

2. The method of claim 1, wherein the co-optimization includes regulatory charging/discharging patterns as hard constraints to prevent violations of minimum and/or maximum SoC boundaries.

3. The method of claim 1, wherein the charging and/or discharging energy further comprises controlling real-time charge and discharge commands based on the GSS scheduling and receiving frequency regulation signals for real-time control of the one or more GSSs.

4. The method of claim 1, further comprising determining a distribution of a regulation signal using statistical analysis.

5. The method of claim 4, further comprising determining scenarios based on the distribution of a regulation signal, the scenarios being employed to calculate the risk indices.

6. The method of claim 1, wherein the tracking upper and/or lower bounds accounts for uncertainties which affect the SoC.

7. The method of claim 3, wherein the controlling further comprises actively controlling power of GSS units based on the optimum GSS schedule to maximize a life-span of one or more GSS units.

8. The method of claim 1, wherein the determining optimal capacity deployment factors, the co-optimization, and calculating risk indices are iteratively performed until a threshold is met.

9. A system for management of one or more grid-scale Energy Storage Systems (GSSs), comprising:

a scheduler for generating an optimal GSS schedule in the presence of frequency regulation uncertainties, the scheduler being further configured to:

determine optimal capacity deployment factors to minimize penalties for failing to provide scheduled energy and frequency regulation up/down services subject to risk constraints;

generate a schedule for a GSS unit by performing co-optimization using the optimal capacity deployment factors, the co-optimization including tracking upper and/or lower bounds on a state of charge (SoC) and including the bounds as a hard constraints the upper bounds being defined as $E_{ub}(h)=(1-\xi)E_{ub}(h-1)-\eta(P_S^e(h)+k_{ru\_min}P_S^{ru}(h)-k_{rd\_max}P_S^{rd}(h))$ and the lower bounds being defined as $E_{lb}(h)=(1-\xi)E_{lb}(h-1)-\eta(P_S^e(h)+k_{ru\_max}P_S^{ru}(h)-k_{rd\_min}P_S^{rd}(h))$, wherein $E_{lb}$ is the lower bounds, $E_{ub}$ is the upper bounds, is self-discharge, $\eta$ is round trip efficiency, $P_S^e$ is capacity in an energy market, $k_{ru\_min}$ is a minimum value of an up deployment percentage, $k_{ru\_max}$, is a maximum value of an up deployment percentage, $k_{rd\_min}$ is a minimum value of a down deployment percentage, $k_{rd\_max}$ is a maximum value of a down deployment percentage, $P_S^{ru}$ is regulation-up capacity, and $P_S^{rd}$ is regulation-down capacity; and calculate risk indices based on the optimal scheduling for the GSS unit, and outputting an optimal GSS schedule if risk constraints are satisfied; and a controller configured to charge and/or discharge energy to or from one or more GSS units based on the generated optimal GSS schedule.

10. The system of claim 9, wherein the co-optimization includes regulatory charging/discharging patterns as hard constraints to prevent violations of minimum and/or maximum SoC boundaries.

11. The system of claim 9, wherein the controller is further configured to control real-time charge and discharge commands based on the GSS scheduling and receiving frequency regulation signal for real-time control of the one or more GSSs.

12. The system of claim 9, further comprising determining a distribution of a regulation signal using statistical analysis.

13. The system of claim 12, further comprising determining scenarios based on the distribution of a regulation signal, the scenarios being employed to calculate the risk indices.

14. The system of claim 9, wherein the tracking upper and/or lower bounds accounts for uncertainties which affect the SoC.

15. The method of claim 11, wherein the controller is further configured to actively control power of the one or more GSS units based on the optimum GSS schedule to maximize a life-span of one or more GSS units.

16. The method of claim 1, wherein the scheduler is further configured to iteratively determine the optimal capacity deployment factors, perform the co-optimization, and calculate the risk indices until a threshold is met.

17. A computer-readable storage medium comprising a computer readable program for management of one or more grid-scale Energy Storage Systems (GSSs), wherein the computer readable program when executed on a computer causes the computer to perform the steps of:

generating an optimal GSS schedule in the presence of frequency regulation uncertainties, wherein GSS scheduling comprises:

determining optimal capacity deployment factors to minimize penalties for failing to provide scheduled energy and frequency regulation up/down services subject to risk constraints;

generating a schedule for a GSS unit by performing co-optimization using the optimal capacity deployment factors, the co-optimization including tracking upper and/or lower bounds on a state of charge (SoC) and including the bounds as a hard constraints, the upper bounds being defined as $E_{ub}(h)=(1-\xi)E_{ub}(h-1)-\eta(P_S^e(h)+k_{ru\_min}P_S^{fu}(h)-k_{rd\_max}P_S^{rd}(h))$ and the lower bounds being defined as $E_{lb}(h)=(1-\xi)E_{lb}$ $(h-1)-\eta(P_S^e(h)+k_{ru\_max}P_S^{ru}(h)-k_{rd\_min}P_S^{rd}(h))$, wherein $E_{lb}$ is the lower bounds, $E_{ub}$ is the upper bounds, is self-discharge, n is round trip efficiency, $P_S^e$ is capacity in an energy market, $k_{ru\_min}$ is a minimum value of an up deployment percentage, $k_{ru\_max}$ is a maximum value of an up deployment percentage, $k_{rd\_min}$ is a minimum value of a down deployment percentage, $k_{rd\_max}$ is a maximum value of a down deployment percentage, $P_S^{ru}$ is regulation-up capacity, and $P_S^{rd}$ is regulation-down capacity; and calculating risk indices based on the optimal scheduling for the GSS unit, and outputting an optimal GSS schedule if risk constraints are satisfied; and charging and/or discharging energy to or from one or more GSS units based on the generated optimal GSS schedule.

18. The computer-readable storage medium of claim 17, wherein the co-optimization includes regulatory charging/discharging patterns as hard constraints to prevent violations of minimum and/or maximum SoC boundaries.

19. The computer-readable storage medium of claim 17, wherein the charging and/or discharging energy further comprises controlling real-time charge and discharge commands based on the GSS scheduling and receiving frequency regulation signals for real-time control of the one or more GSSs.

20. The computer-readable storage medium of claim 17, wherein the determining optimal capacity deployment factors, the co-optimization, and calculating risk indices are iteratively performed until a threshold is met.

* * * * *